United States Patent [19]

Grengg et al.

[11] 4,025,808
[45] May 24, 1977

[54] COMMUTATING MACHINE WITH INTEGRAL SPEED CONTROL

[75] Inventors: Walter M. Grengg, Madison; Karl E. Weitzmann, Middleton, both of Wis.

[73] Assignee: Barber-Colman Company, Rockford, Ill.

[22] Filed: July 21, 1975

[21] Appl. No.: 597,537

[52] U.S. Cl. .................. 310/68 B; 310/245
[51] Int. Cl.² .................................. H02K 11/00
[58] Field of Search ......... 310/67, 40 MM, 72, 73, 310/68 B, 68 E, 168, 219–247, 171, 273, 148–151; 324/166, 168, 171; 318/326, 327, 360, 361, 439, 242

[56] References Cited

UNITED STATES PATENTS

| | | | |
|---|---|---|---|
| 2,478,848 | 8/1949 | Sullivan | 310/68 E |
| 2,481,819 | 9/1949 | Brown | 310/68 E |
| 2,814,770 | 11/1957 | Tourtellot | 310/68 E |
| 2,997,559 | 8/1961 | Caton | 310/232 |
| 3,023,488 | 3/1962 | Wellner | 310/235 |
| 3,683,219 | 8/1972 | Kruse | 310/171 |
| 3,812,391 | 5/1974 | Johnson | 310/168 |
| 3,867,679 | 2/1975 | Smith | 310/240 |

FOREIGN PATENTS OR APPLICATIONS 1,438,259  10/1968  Germany .................. 310/68 E

*Primary Examiner*—R. Skudy
*Attorney, Agent, or Firm*—A. Richard Koch

[57] ABSTRACT

A motor or generator having a commutator and brushes for transfer of current to and from rotor windings has a stationary conducting sensor in sliding contact with the commutator, said sensor being narrower at its contact with the commutator than the insulation between the commutator bars where contacted by the sensor, so that a sensing circuit is interrupted between the sensor and one of the brushes at a frequency proportional to the speed of the rotor.

11 Claims, 3 Drawing Figures

COMMUTATING MACHINE WITH INTEGRAL SPEED CONTROL

BACKGROUND OF THE INVENTION

This invention is concerned with dynamo-electric machines of the commutating type combined with an integral speed sensor, producing a speed sensitive signal usable to measure or control the speed of the machine.

Speed sensing devices for dynamo-electric machines are well-known in the art. Among the best and longest known are centrifugal devices and tachometer generators. Centrifugal devices are inaccurate and subject to failure due to the effects of friction, wear and fatigue. Tachometer generators are relatively expensive. More recently magnetic pick-ups and optical sensors have been employed to sense speed. These latter sensors generate the pulses required for digital controls. Both are relatively expensive. Less expensive sensing devices are desirable, especially for use with small machines.

SUMMARY OF THE INVENTION

By modifying a dynamo-electric machine of the commutating type, an inexpensive speed sensor has been provided integral with the machine. This is accomplished by modifying the commutator and adding a current pick-up. It is suitable for use in digital measuring and control circuits.

DESCRIPTION OF THE PREFERRED EMBODIMENT

Figure 1:
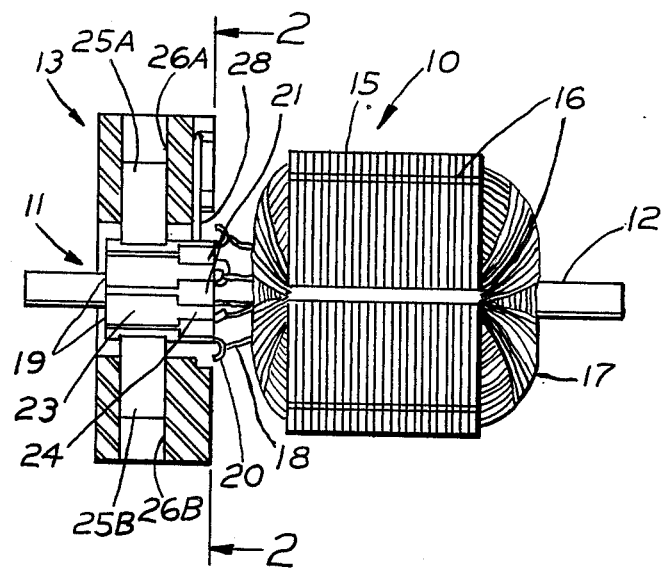
FIG. 1 is a view, partially in section, of a rotor and commutator sub-assembly and a brush and sensor sub-assembly according to this invention.

As shown in FIG. 1, a wound rotor 10 and a commutator 11 are concentrically affixed to a shaft 12 supported for rotation about an axis fixed with respect to a stationary brushholder 13, spaced from and encircling said commutator.

The rotor 10 comprises a core 15 built up of laminations and having a plurality of axial slots 16 spaced around its periphery. A plurality of windings 17A-G (collectively 17) are retained in the slots in a predetermined pattern, shown as lap wound in FIG. 3. The connections 18 A-G between adjacent windings are joined to respective commutator bars 19A-G at fingers 20. The commutator bars are spaced around the periphery of the commutator 11 and separated from each other by insulation 21. Each commutator bar 19 has a wide portion 23 and one or more of the narrow portions 24 extending axially therefrom. A pair of brushes 25 A, B, are guided by channels 26 A, B, respectively, in the brushholder 13 into contact with the wide portions 23 of the commutator bars 19. The brushes 25 are wide enough so that, as the commutator 11 rotates, each brush is at all times in sliding contact with at least one of the commutator bars 19. Except for the narrow portions 24 of the commutator bars 19, the apparatus thus far described is conventional and well-known in the art.

Figure 2:
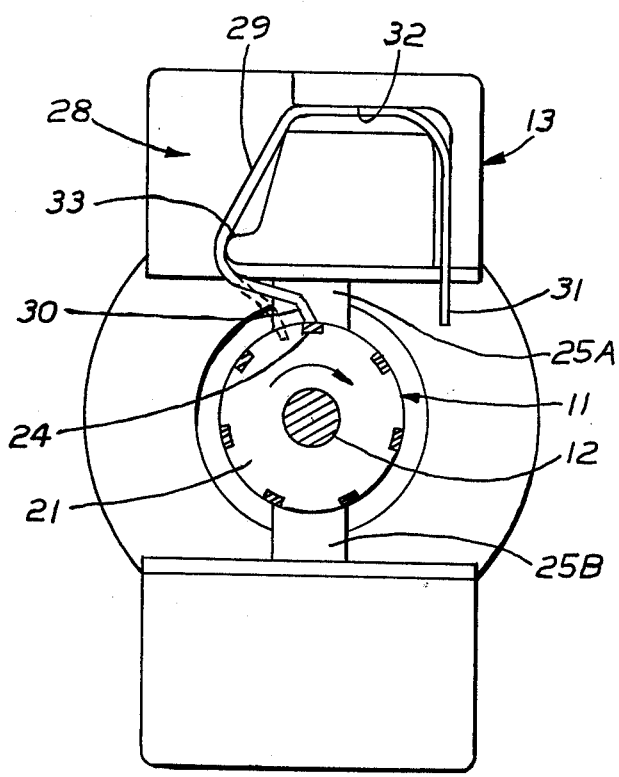
FIG. 2 is a view through section 2—2 of FIG. 1

The invention involves the addition of a stationary conducting sensor 28 biased into sliding contact with the commutator 11 as the commutator rotates. The sensor 28 is positioned with respect to the commutator 11 so that the sensor contacts only the narrow portions 24 of commutator bars 19. The area of contact between the sensor 28 and the commutator 11 is substantially narrower than the insulating space between adjacent narrow portions 24 of the commutator bars 19 coming into sliding contact with the sensor, to assure that the contact between the sensor and adjacent commutator bars is broken. As shown in FIG. 2 the sensor 28 comprises a resilient wire 29, having an end 30 in engagement with the commutator 11 and a terminal 31 for connection into an external circuit. The wire is initially formed as shown in dashed lines and positioned on the brushholder 13 by insertion in a groove 32. When the brushholder and rotor sub-assemblies are brought together, the wire 28 is deflected to the solid line position, thereby stressing the wire to bias the end 30 into contact with the commutator 11. A projection 33 serves as a stop to locate the end 30 at a definite position with respect to the commutator.

Figure 3:
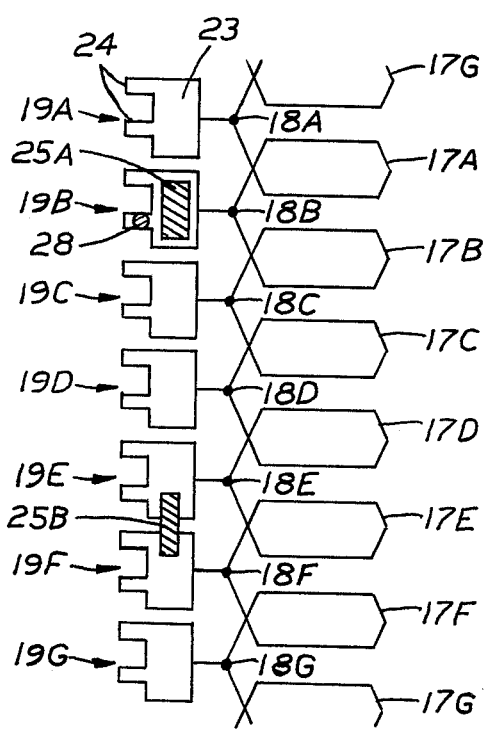
FIG. 3 is a schematic circuit diagram of the power and sensing circuits.

As seen in FIG. 3, a continuous power circuit is provided between brushes 25A and 25B through commutator bar 19B, connection 18B, winding 17B, connection 18C, winding 17C, connection 18D, winding 17D, connection 18E and commutator bar 19E. As the commutator rotates different commutator bars will come into sliding engagement with the brushes as determined by the instantaneous angular position of the commutator 11 with respect to the brushes 25A, B. The circuits between the brushes will be similar to that shown, but the specific commutator bars, connections and windings involved will be different. The changing power circuit is never broken.

An interruptable sensing circuit is provided between the sensor 28 and one of the brushes 25. If the brush 25A is to provide the common terminal for the sensing circuit, only one commutator bar 19B in the position shown, is required to complete the circuit between sensor 28 and brush 25A. When the commutator rotates so that the sensor does not contact any commutator bar, the circuit is broken. The circuit will be completed through any commutator bar in contact with both brush 25A and sensor 28. If the sensor were in some other position with respect to the brush acting as the common terminal, additional components would be included in the sensing circuit. Let us assume that brush 25B provides the common terminal. Then the sensing circuit between sensor 28 and brush 25B would comprise commutator bar 19B, connection 18B, winding 17B, connection 18C, windingg 17C, connection 18D, windng 17D, connection 18E and commutator bar 19E. The specific components appearing in the circuit would change as the commutator rotates, but similar paths would be formed. Once again the sensing circuit betweeen sensor and brush would be broken when the sensor is out of contact with any commutator bar. It will be seen that regardless of the relative angular positions of the sensor and brush around the commutator, the sensing circuit will be repeatedly made and broken as the commutator rotates. It is desirable, but not always necessary that the portions of the commutator bars contacted by the sensor be of the same size and evenly spaced around the commutator. It is also unnecessary to have every commutator bar contacted by the sensor, but more accurate speed sensing is possible as the number of commutator bar positions contacted by the sensor is increased. It will also be apparent that the commutator bars may be of one width throughout their lengths, if the insulating spaces between them are substantially wider than the sensor and substantially narrower than the brushes. The frequency of the resulting pulses of current will be proportional to the number of insulating spacers between those portions of commutator bars as are contacted by the sensor and to the speed of rotation. The frequency of the pulses so produced may be employed to measure the speed of the machine, as a feedback in a speed control circuit, in digital counting circuits for position control or readout, and the like.

Direct current introduced into windings 17 through brushes 25 may be employed to produce magnetic flux in a DC motor. Current induces in windings 17 by magnetic flux in DC generator will be rectified by the commutator 11 so that direct current is delivered from the brushes 25. In either event substantially square wave DC pulses will be produced between the sensor 28 and the common brush. When the sensor 28 is positioned with respect to the common brush, such as 25A, so that both are in contact with the same commutator bar, such as 19B, it would be possible to supply alternating current to the power circuit through brushes 25 in a series motor, if a separate external source of direct current were employed in the sensing circuit through sensor 28 and the common brush 25A. This application would also produce substantially square wave DC pulses. In general this invention has application in electro-dynamic commutating machines.

The embodiment shown and described is only illustrative of the invention, the limits of which are defined by the claims.

We claim:

1. In combination in an electro-dynamic commutating machine, a rotor rotatable about an axis; a commutator concentric and rotatable with said rotor; a plurality of commutator bars on the commutator; a plurality of windings on said rotor between respective pairs of the commutator bars; insulation separating the commutator bars; a pair of stationary brushes in sliding contact with said commutator; each of said brushes at all times contacting at least a respective one of the commutator bars determined by the instantaneous angular position of the commutator with respect to said brushes whereby a continuous power circuit from one to another of the brushes comprises a first of said commutator bars, at least one of the windings and a second of said commutator bars; and characterized by an interruptable sensing circuit comprising a stationary conducting sensor in sliding contact with said commutator; the area of contact between said sensor and the commutator being substantially narrower than the spaces between adjacent portions of said commutator bars coming into sliding contact with the sensor; the insulation in said spaces breaking contact between said sensor and the adjacent commutator bars.

2. A combination according to claim 1 wherein each of said commutator bars comprises a wide portion for sliding contact with said brushes and a narrow portion for sliding contact with the sensor.

3. A combination according to claim 1 wherein the width of said insulation in sliding contact with the brushes is narrower than the width of said insulation in sliding contact with the sensor.

4. A combination according to claim 1 additionally comprising means biasing said sensor toward the commutator.

5. A combination according to claim 1 wherein said sensor comprises a wire.

6. A combination according to claim 5 wherein an end of said wire contacts the commutator.

7. A combination according to claim 1 additionally comprising a terminal on said sensor adapted for connection as an input to an external circuit.

8. A combination according to claim 1 wherein said closed interruptable sensing circuit further comprises one of said brushes, the first of said commutator bars, at least the one of said windings and a third of said commutator bars.

9. A combination according to claim 1 wherein said closed interruptable sensing circuit further comprises said one brush and the first of said commutator bars.

10. A combination according to claim 1 wherein each of said commutator bars comprises a wide portion for sliding contact with said brushes and a plurality of narrow portions for sliding contact with the sensor.

11. A combination according to claim 1 wherein said interruptable sensing circuit further comprises one of said brushes, the first of said commutator bars, at least one of said windings and the second of said commutator bars.

* * * * *